Aug. 17, 1954
G. E. MALLINCKRODT
2,686,882
ROTATION STRESSED PIEZOELECTRIC APPARATUS
Filed Jan. 28, 1952
3 Sheets-Sheet 1
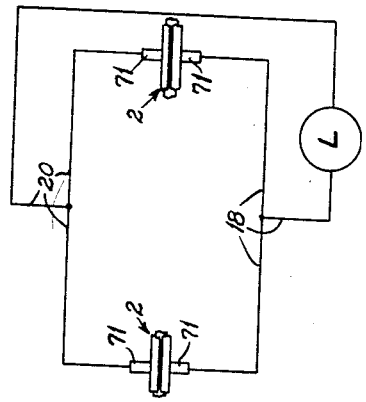
FIG. 6.
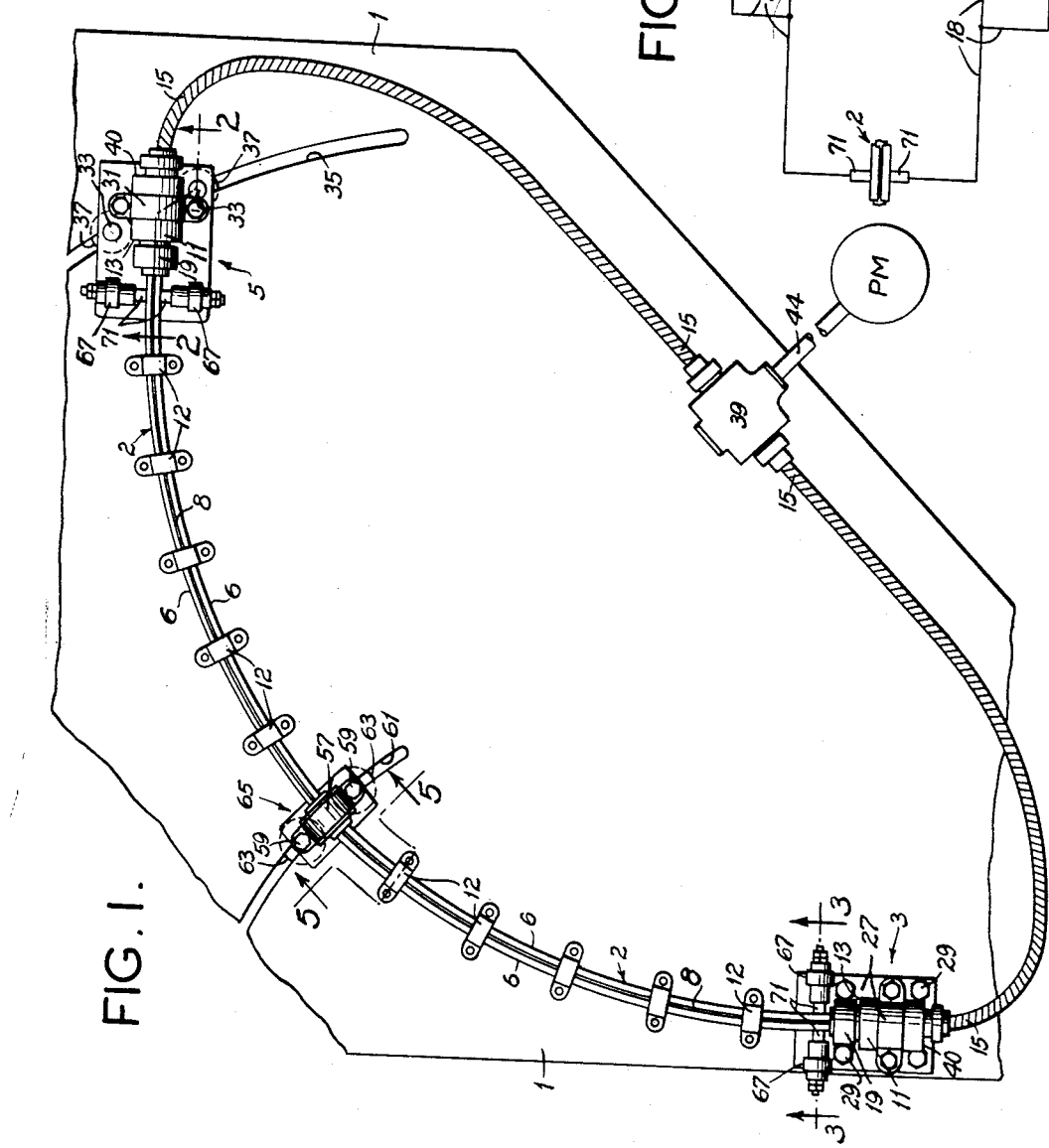
FIG. I.
George E. Mallinckrodt,
Inventor.
Koenig and Pope,
Attorneys.

Aug. 17, 1954     G. E. MALLINCKRODT     2,686,882
ROTATION STRESSED PIEZOELECTRIC APPARATUS
Filed Jan. 28, 1952     3 Sheets-Sheet 2

Aug. 17, 1954
G. E. MALLINCKRODT
2,686,882
ROTATION STRESSED PIEZOELECTRIC APPARATUS
Filed Jan. 28, 1952
3 Sheets-Sheet 3
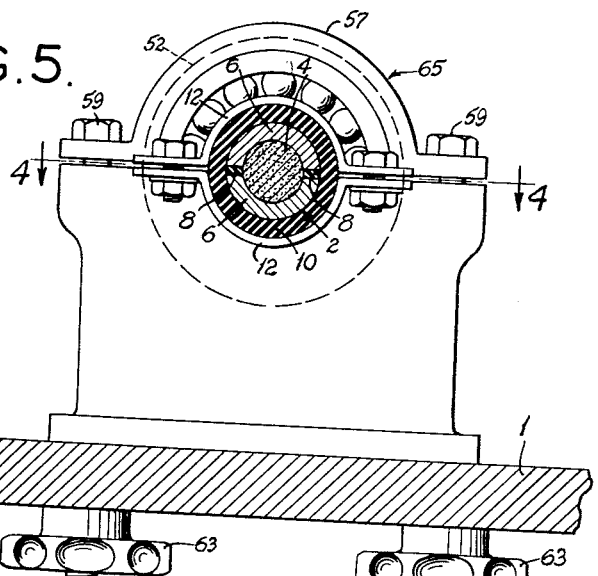
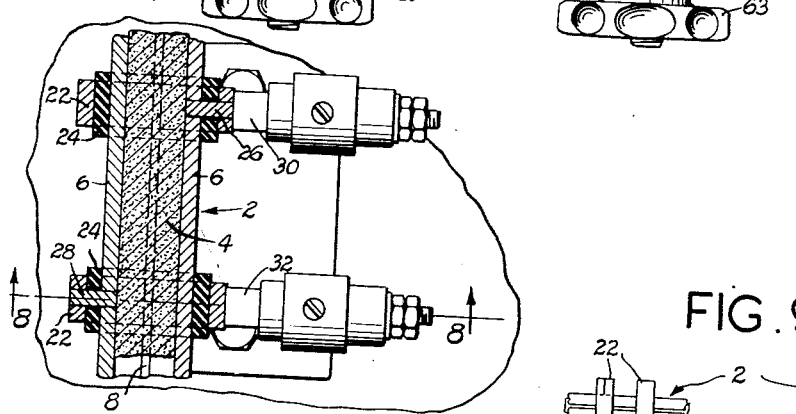
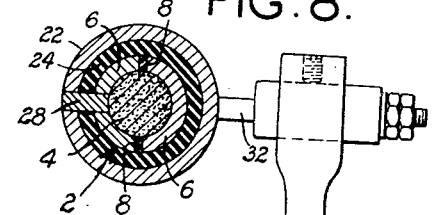
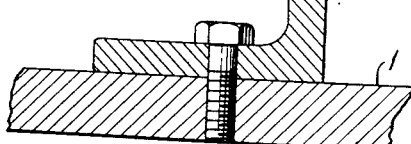
George E. Mallinckrodt
Inventor
Koenig and Pope,
Attorneys.

Patented Aug. 17, 1954

2,686,882

UNITED STATES PATENT OFFICE 2,686,882

ROTATION STRESSED PIEZOELECTRIC APPARATUS

George E. Mallinckrodt, St. Louis, Mo.

Application January 28, 1952, Serial No. 268,545

5 Claims. (Cl. 310—8.5)

This invention relates to dynamoelectric apparatus, and with regard to certain more specific features, to piezoelectric apparatus of this class.

Among the several objects of the invention may be noted the provision of a dynamoelectric apparatus of either a D. C. or A. C. variety, in which the required strains for stressing a piezoelectric material are continually varied by means of toroidal rotation of the material, so that mechanical energy may be translated and a flow of D. C. or A. C. energy may be conveniently obtained by action from a continuously rotating prime mover or the like. Other objects will be in part apparent and in part pointed out hereinafter.

The invention accordingly comprises the elements and combinations of elements, features of construction and arrangements of parts which will be exemplified in the structures hereinafter described, and the scope of which will be indicated in the following claims.

In the accompanying drawings, in which several of various possible embodiments of the invention are illustrated, Fig. 1 is a plan view of a D. C. form of the invention;

Fig. 5 is a vertical section taken on line 5—5 of Fig. 1;

Fig. 6 is a wiring diagram of the D. C. form of the invention shown in Fig. 1;

Fig. 7 is a fragmentary horizontal section illustrating an alternative current collector system for A. C. operation;

Fig. 8 is a vertical section taken on line 8—8 of Fig. 7; and,

Fig. 9 is a wiring diagram applicable to the A. C. form of the invention illustrated in Figs. 7 and 8.

Figure 2:
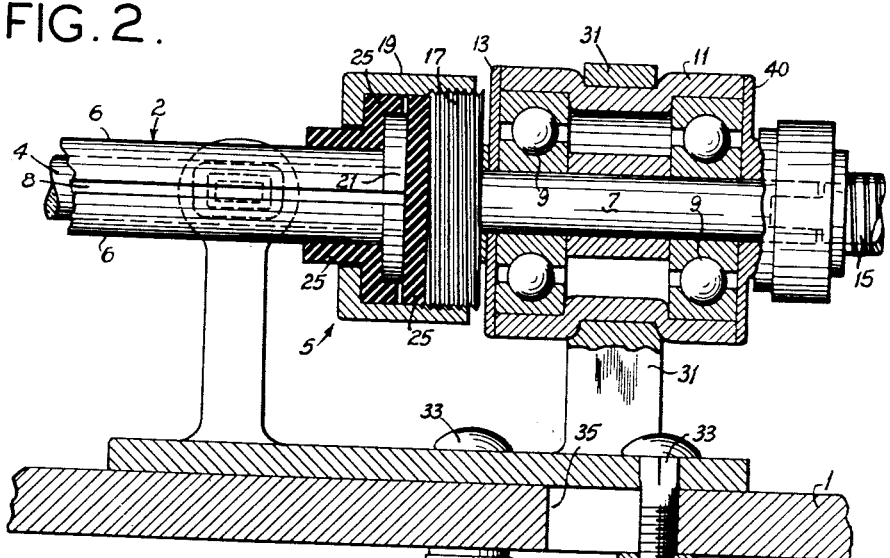
Fig. 2 is a vertical section taken on line 2—2 of Fig. 1.
Figure 3:
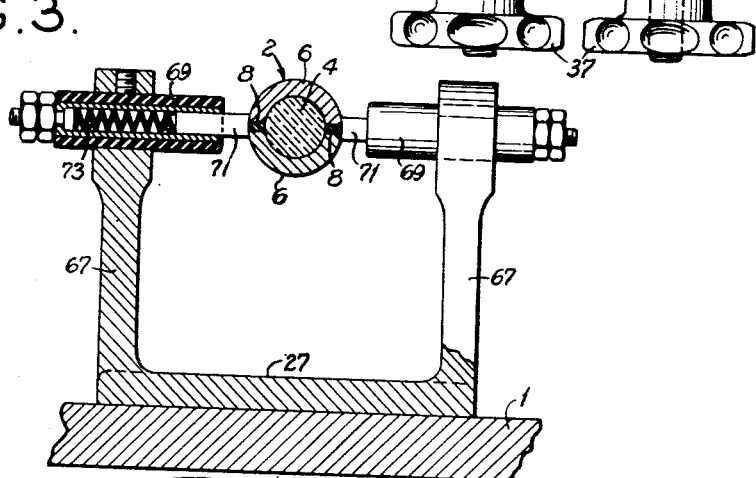
Fig. 3 is a vertical section taken on line 3—3 of Fig. 1.
Figure 4:
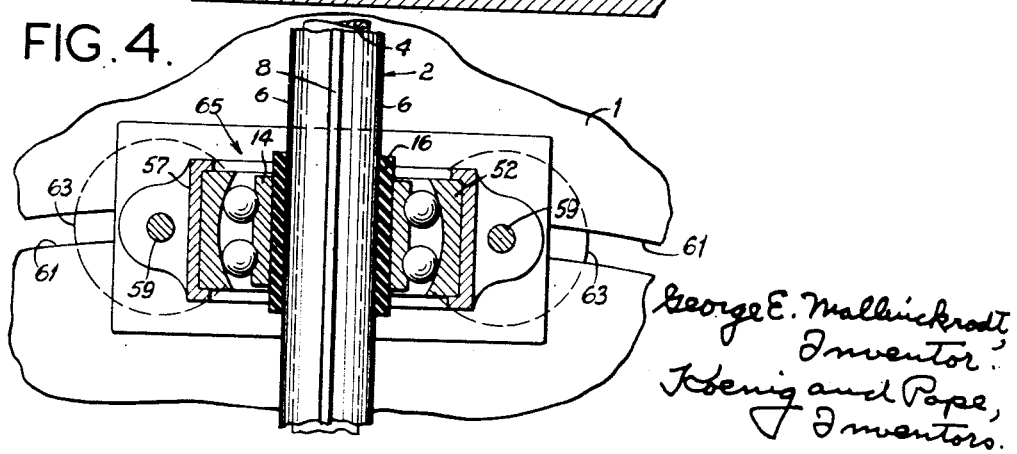
Fig. 4 is a horizontal section taken on line 4—4 of Fig. 5.

Relative to Fig. 1, Figs. 2–5, 7 and 8 are on an enlarged scale. Similar reference characters indicate corresponding parts throughout the several views of the drawings.

Briefly, the invention as a generator consists in providing in a load circuit a composite rod of material composed of a piezoelectric core flanked by axially separated lengths of resilient conductive material designed to collect induced charges of opposite polarities as generated by the piezoelectric rod. The polarities are caused cyclically to change in accordance with cyclic stresses applied to the piezoelectric material by bending it laterally of its length and rotating it toroidally. Collector brushes are used directly against the conductive lengths for collecting a pulsating D. C. and supplying it to a load circuit; or such brushes are used in connection with slip rings connected to the conductive lengths for collecting A. C. which is supplied to a load circuit. The bending of the rod is sufficient to induce the required stresses for a substantial voltage output without stressing the rod above the effective elastic limit of any of its components and without an excessive temperature rise.

Referring now more particularly to Fig. 1, there is shown at numeral 1 a base upon which are mounted two bearing arrangements 3 and 5. These arrangements include certain identical parts. A description of one group of these as shown in Fig. 2 will be sufficient. Each such group comprises a short shaft 7 carried by the inner races of a pair of ball bearings 9. The outer races of the ball bearings are carried in a sleeve 11 having end closures 13 and 40. Coupled at one end of each shaft 7 is a flexible drive cable 15. The other end of each shaft 7 is constituted by a threaded flange 17 for receiving a threaded chuck member 19. Each chuck member 19 holds the flanged end 21 of a composite rod indexed generally by the numeral 2. Electrical insulation 25 insulates the chucked end of the rod 2.

A pillow block support 27 of the arrangement 3 is permanently attached to the base 1 by means of bolts 29. The arrangement 5 has a pillow block support 31 (Fig. 2) carrying bolts 33 which ride in a curved slot 35 in the base 1. The entire assembly at 5 is adapted to be moved along the slot and clamped in any suitable position by threaded handwheels 37.

The two flexible drive cables 15 enter a common gear box 39 which is powered by a shaft 44 from a prime mover PM. Suitable gears are used in the box 39 to obtain a common speed for both of the drive cables 15 (for example, several thousand R. P. M.). Obviously, the cable 15 reaching from box 39 to the arrangement 3 could be eliminated and a rigid mechanical drive connection substituted, but if so, the angular velocity supplied to the shaft 7 in the block 27 of arrangement 3 must be the same as that of the shaft 7 in the bearing of arrangement 5.

The composite rod 2 is originally constructed of straight lengths of material comprising a central round core 4 of piezoelectric material, such as quartz, Rochelle salt, ammonium dihydrogen phosphate or other natural or artificial materials which have piezoelectric properties. This core is enveloped by two trough-shaped resilient conductive segments or commutation elements 6, the edges of which are spaced and separated from one another by an insulating material 8. The conductors 6 may be composed of beryllium copper. It is these conductors which are shaped at the ends to provide the flanges 21 to be gripped in the chucks 19. When so gripped, the assembly 2 is laterally bent, as indicated in Fig. 1. The members 4, 6 and 8 are held together as an assembly by means of resilient insulating rings 10 positioned at intervals along the assembly 2 and constricted by bolted clamps 12. The total length of the assembly 2 is of the order of 3 feet. Exemplary dimensions in cross section are: the piezoelectric core, ¼-inch diameter; the segments 6, 1/16-inch thick; and the outside diameter of the assembly, ⅜-inch.

The bent rotary assembly 2, as shown in Fig. 1, is intermediately steadied by passing through a steadying bearing 65. This is composed of an outer race 52 of spherical inside shape, surrounded by a pillow block 57 having studs 59 riding in a curved slot 61 in the base 1. Studs 59 carry threaded handwheels 63 for clamping the pillow block in any desired adjusted position in the slot 61. Between the inner race 14 of the bearing and the assembly 2 is located a resilient insulating bushing 16.

Adjacent the ends of the member 2 are pairs of pedestals 67, carrying oppositely located conductive brushes 71. These brushes may be located in the plane of the bent assembly 2, or in any other plane adapted to collect maximum current. This plane may be different for different anisotropic characteristics of the rod 4. The brushes are carried within insulating sleeves 69 and are biased by means of compression springs 73 against opposite sides of the member 2. Each pedestal 67 extends up from the appropriate block 27 or 31, as the case may be.

The purpose of the groove 35 is to permit the assembly 5 to be adjusted along a trajectory so as to produce changes in lateral deflection away from a straight axis of member 2. The purpose of the groove 61 allows for coordinated adjustments of the steadying bearing 65. An operating curvature of the rod 2 is illustrated in Fig. 1.

Operation is as follows, referring to Figs. 1 and 6:

The prime mover is turned on, thus rotating the drive cables 15 in the same angular velocity, which toroidally rotates the assembly 2 on its curved axis. The piezoelectric rod or core 4 is compressed on the inside of its curvature and placed in tension in the same plane on the outside. As a result, opposite inside and outside piezoelectric charges are generated. Each segment 6 receives a charge of polarity opposite to that of the part of the rod 4 which is adjacent to it. Thus as each segment 6 moves through the inside of the curved assembly 2 it receives one charge, and as it moves past the outside of the curved assembly 2 it receives an opposite charge. Fig. 6 illustrates how the charged inside segment is connected through the inside brushes 71 with a load L by means of a circuit part 18; and wherein the oppositely charged segment is shown as being connected to the other side of the load L through the outside brushes 71 with a load L by means of a circuit part 20.

The result is a pulse of current through the load. As time progresses, the segments 6 interchange their positions with respect to the inside and outside of the rotating assembly 2, whereupon another pulse of current in the same direction is sent through the load L. The result is a pulsating direct current through the load L which will have a relatively low ripple content when the assembly 2 is rotated at several thousand R. P. M.

The amount to which the bending of the assembly 2 is adjusted is such as to produce maximum current with an acceptable temperature rise above room temperature therein, say 60° C., and so as not to exceed the operating elastic limit of any part of the assembly 2.

If it is desired to obtain an A. C. output, the structural modification shown in Figs. 7–9 is used, wherein at each end of the assembly 2 (near the respective arrangements 3 and 5) annular slip rings 22 are employed. These are located on annular insulators 24 around the assembly 2. One slip ring at each end of 2 is placed in electrical connection with one segment 6, as shown at 26, and the other slip ring at each end of 2 is placed in electrical connection with the other segment 6, as shown at 28. Collector brushes 30 and 32 engage the respective slip rings. The two brushes 30 that are thus placed in electrical connection with one segment feed one side of the load L through circuit elements 34. The two brushes 32 that are thus placed in electrical connection with the other segment feed the other side of the load L through circuit elements 36. The result is an A. C. current through the load L.

It will be seen that the assembly 2 can be considered as comprising a core of piezoelectric material with a sheath composed of conductive segments insulated from one another, wherein each segment has the function of receiving the induced charge from the piezoelectric core and also functioning as a commutator segment for cooperation with current collecting means. It will be apparent that instead of using a single pair of segments, the pairs may be multiplied as four, six, eight, et cetera. The segments may also be formed by so-called metallizing of spaced axial stripes on the core. Various metallizing processes for the purpose are known, such as sputtering or evaporation of the metal material onto the surface of the rod in the desired pattern for the sheath.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An electrical generator comprising a length of piezoelectric material which is strained to assume a position along a curved line, means for toroidally rotating the resultingly stressed material around said line, and electrical collector means connected with the material at points thereon which differ in voltage due to stresses engendered as it rotates.

2. An electrical generator comprising a length of piezoelectric material which is strained to assume a position along a curved line, conductive members insulated from one another and engaging said material in a lengthwise direction, means for toroidally rotating the resultingly stressed piezoelectric material around said line, and collector means located for contact with said conductive members at points of different electrical potential therein.

3. A dynamoelectric machine comprising a length of piezoelectric material which is strained to assume a position along a curved line, rotary bearing means adapted to hold said length of material in curved position along said curved line but letting it free for toroidal rotation about the line, conductive means connected with the material at points thereon which differ in stresses due to curvature, an electric circuit, and means connecting the electric circuit with and closing it across said conductive means.

4. A dynamoelectric machine made according to claim 3, including a support for the bearing means, and means for adjusting the bearing means relative to the support adapted to change the curvature of said line.

5. A dynamoelectric machine made according to claim 3, in which said conductive means consists of spaced commutation elements which are insulated from one another.

References Cited in the file of this patent
UNITED STATES PATENTS

| Number | Name | Date |
| --- | --- | --- |
| 1,884,547 | Bower | Oct. 25, 1932 |
| 2,439,499 | Williams et al. | Apr. 13, 1948 |
| 2,478,223 | Argabrite | Aug. 9, 1949 |